United States Patent [19]

Trabbold et al.

[11] 4,131,780
[45] Dec. 26, 1978

[54] UNDERWATER CUTTING AND GOUGING TORCH

[75] Inventors: Harold J. Trabbold; Jerry R. Hummel, both of Lancaster, Ohio

[73] Assignee: Air Products and Chemicals, Inc., Allentown, Pa.

[21] Appl. No.: 850,750

[22] Filed: Nov. 11, 1977

Related U.S. Application Data

[63] Continuation of Ser. No. 687,940, May 19, 1976, abandoned.

[51] Int. Cl.² .................................................. B23K 9/14
[52] U.S. Cl. ........................................ 219/70; 219/68; 219/72
[58] Field of Search .................. 219/70, 69 M, 72, 74, 219/75, 68, 69 E

[56] References Cited

U.S. PATENT DOCUMENTS

| | | | |
|---|---|---|---|
| 2,396,307 | 3/1946 | Waterman | 219/70 |
| 2,417,650 | 3/1947 | Kandel | 219/70 |
| 2,726,309 | 12/1955 | Stepath | 219/70 |
| 2,727,127 | 12/1955 | Dority | 219/70 |
| 3,387,111 | 6/1968 | Driscoll | 219/75 X |
| 3,403,085 | 9/1968 | Berger | 219/68 X |
| 3,566,069 | 2/1971 | Henderson | 219/70 |
| 3,651,302 | 3/1972 | Maddison | 219/70 |
| 3,751,625 | 8/1973 | Hummel | 219/70 |
| 3,967,090 | 6/1976 | Hamasaki | 219/70 |
| 4,069,407 | 1/1978 | Brower | 219/70 |

*Primary Examiner*—Richard R. Kucia
*Attorney, Agent, or Firm*—James C. Simmons; Barry Moyerman

[57] ABSTRACT

An underwater cutting and welding torch wherein the torch head carries both the welding electrode and means for directing a high pressure fluid toward an arc struck between the electrode and a workpiece. The high pressure fluid preferably is the water in which the torch is being operated.

4 Claims, 5 Drawing Figures

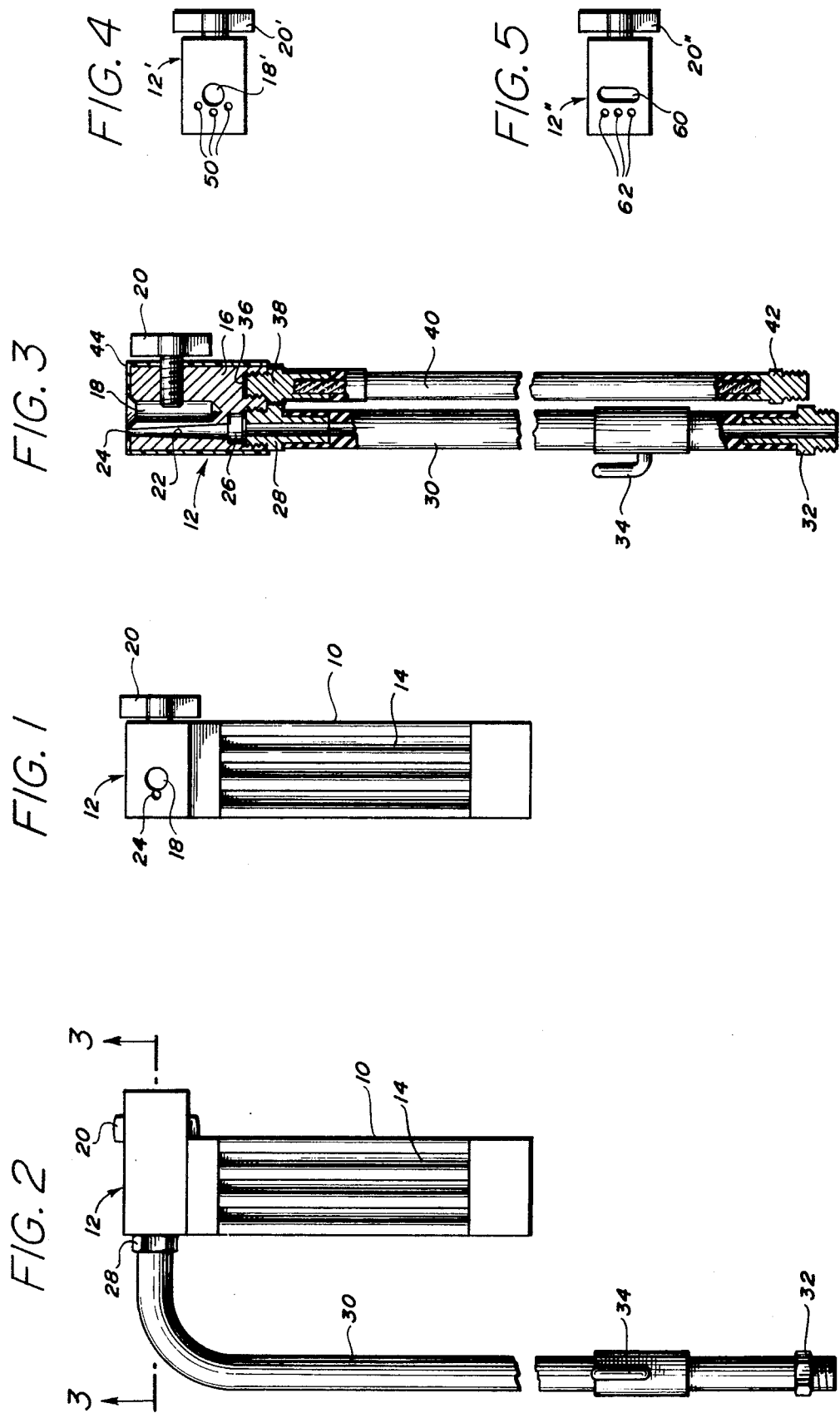

UNDERWATER CUTTING AND GOUGING TORCH

This is a continuation, of application Ser. No. 687,940, filed May 19, 1976 now abandoned.

BACKGROUND OF THE INVENTION

This invention pertains to electric-arc cutting and welding torches and in particular, electric-arc cutting and welding torches for use in underwater environments. Torches for use underwater find utility in salvaging sunken vessels, repairing floating vessels such as ships, barges, and the like; and in construction, and maintenance of fixed structures such as bridges, seawalls, piers, oil drilling platforms, and the like.

Conventional underwater torches are illustrated in U.S. Pat. Nos. 2,396,307; 2,417,650; 3,462,463; and 3,751,625. The last named patent illustrates an underwater torch that has found acceptance in the trade.

All of the foregoing torches were developed for use with the conventional underwater cutting technique employing a tubular electrode and oxygen gas. In the conventional underwater cutting technique an arc is struck between the piece being cut and the electrode, and oxygen gas is forced down through the bore of the electrode to achieve the chemical cutting action under the influence of the arc.

Such torches require auxiliary sources of oxygen which are usually maintained on the diving support ship and piped to the torch via long lengths of hose.

SUMMARY OF THE INVENTION

In order to modernize underwater cutting, a new method was discovered wherein a solid electrode is employed to provide the arc for cutting. After the arc is struck, high pressure fluid is forced against the molten metal thus clearing it from the cut. It was discovered that the high pressure fluid could be the water in which the cutting was taking place. However, this necessitated directing the fluid along the electrode toward the arc instead of down through the electrode. The new process is not dependent on oxygen or chemical reaction in the cutting process and is detailed in a copending application Ser. No. 687,931, filed May 19, 1976.

With the advent of the new welding process, a new welding torch was designed which employs an electrode carrying means and means for directing the stream of high pressure fluid toward the arc. Such a torch was designed to have a minimum number of conductive members with positive electrode clamping means and a conduit with a nozzle aperture for directing the fluid along the electrode toward the arc.

Therefore, it is the primary object of this invention to provide an improved underwater cutting and welding torch.

It is another object of this invention to provide an underwater torch employing a minimum number of electrical conducting members.

It is yet another object of this invention to provide an underwater torch employing positive means for gripping a solid electrode.

It is still another object of this invention to provide a compact, lightweight, safe and durable underwater cutting and welding torch.

BRIEF DESCRIPTION OF THE DRAWINGS

FIG. 1 is a front elevational view of a torch according to the present invention.

FIG. 2 is a left side elevational view of the torch according to the present invention.

FIG. 3 is a partial sectional view taken along line 3—3 of FIG. 2 with the hose and cable in partial section for illustrative purposes extended in a longitudinal direction.

FIG. 4 is a front elevational view of an alternate embodiment of the torch head of the present invention.

FIG. 5 is a front elevational view of yet another alternate embodiment of the torch head of the present invention.

DETAILED DESCRIPTION OF THE PREFERRED EMBODIMENT

FIG. 1 illustrates the underwater cutting and welding torch of the present invention.

The torch includes a handle 10 and a head designated generally as 12. The handle 10 is shown to be in the shape of an elongated cylinder having thereon a plurality of grooves or ribs of semi-circular cross section 14 to facilitate gripping by the operator during use. While the handle 10 is shown as cylindrical, its shape is not critical, the handle need only be adapted to a welder's hand for guiding the torch head 12 toward the workpiece.

In describing the torch head 12, reference should be taken to both FIGS. 1 and 3. The head 12 includes a conductive member 16 which can be a solid block of metal such as copper or a brass alloy. The block 16 contains a recess 18 of generally cylindrical shape to accomodate a cylindrical electrode. The diameter of recess 18 is selected based upon the diameter of the electrode being employed. With the torch of the present invention a graphite electrode such as normally employed in the air-carbon arc cutting and gouging process is used. The electrode is first covered with a thin metallic copper coating to enhance the conductivity between block 16 and the electrode. In those portions projecting from the torch, the electrode is provided with a suitable protective covering such as disclosed in U.S. Pat. No. 3,835,288. The preferred waterproof coating is a thermosettable epoxy resin applied directly on top of the copper coating. One such resin is sold by Michigan Chrome and Chemical Company under the trade designation MICCRONTYPE 650 epoxy as disclosed in the aforementioned patent. To assure positive contact of the electrode to the block 16 and to prevent movement of the electrode as a result of the arc, a positive electrode clamping member 20 is included in the head. Member 20 can be a simple threaded stem with a star-shaped knob which communicates through block 16 to recess 18 to positively clamp the electrode within the recess by turning the knob as is well known in the art.

Also included in block 16 is a passage 22 terminating in a nozzle-like aperture 24, the nozzle-like aperture 24 being disposed adjacent that portion of recess 18 opening onto the surface of head 12. The nozzle-like aperture 24 can be of any shape; however, a simple circular cross-section is found to be very effective. The passage 22 extends through block 16 and communicates with a counter bore and partially threaded opening 26 in head 12 opposite aperture 24. Threaded into the threaded portion of counter bore 26 is a fluid conduit adapter 28 which in turn is connected to a fluid hose 30. Hose 30 includes a suitable connector 32 on the opposite end for connection to a source of fluid under pressure as will hereinafter be explained. Also included in fluid conduit is a control valve or clamp 34 for admitting or preventing fluid from entering passage 22. The fluid is preferably water as disclosed in the copending application set out above and is provided to conduit 30 by a high pressure pump. The pump may be a submersible type which is located near the welding area or the fluid may be pumped from a remote location such as a surface tender.

Adjacent the counter bore 26 is a second threaded recess 36 which receives an electrical conduit adapter 38 which in turn is connected to an electrical conduit 40 having on its opposite end a suitable electrical connector 42 for connection to a source of welding current such as a power supply contained on the diving tender. Electrical conduit 40 is provided with suitable shielding which extends to adapter 38 to prevent stray electrical currents from coming in contact with the diver.

Head 12 is covered with an insulated coating 44 to prevent contact of the electrical conducting block 16 to the diver. Only the inner portion of recess 18 does not have an insulating coating so that there can be good electrical contact between the electrode (not shown) and conductive block 16.

There is shown in FIG. 4 another embodiment of the head of the present invention 12' having an electrode gripping member 20' the electrode recess 18' is as described in relation to FIGS. 1, 2 and 3. The embodiment of FIG. 4 includes a plurality of fluid passages 50 adjacent recess 18 for directing the fluid down along the electrode in a manner identical to the nozzle-like aperture 24 of the embodiment of FIG. 1.

FIG. 5 discloses yet another embodiment of a torch head 12" including an electrode clamping member 20". In this embodiment the electrode recess 60 is in the form of a rectangular aperture having semi-circular ends. This aperture is included to accomodate a graphite electrode that is generally flat in shape such as disclosed in U.S. Pat. No. 3,566,069. The so-called flat electrode is also made from a carbonaceous material, e.g. graphite, and is provided with both the copper coating and for the portions projecting beyond the torch head 12" a waterproof coating such as disclosed in relation to the cylindrical electrode used in the embodiment of FIGS. 1-3. In the embodiment of FIG. 5 a plurality of nozzle apertures 62 are disposed on one of the flat sides of the rectangular shaped aperture 60 for conducting fluid along the electrode.

In the foregoing description a torch is disclosed that will accomodate a copper coated graphite electrode having a waterproof coating thereon. The torch is adapted to carry current to the electrode so that an arc can be struck between the electrode and a workpiece being cut underwater. The nozzle-like aperture 24 or apertures 50 and 62 communicate with a passage 22 which receives a fluid under pressure directed at the arc to remove the molten metal which occurs as a result of the arc between the electrode and the workpiece. Thus, there is disclosed a cutting torch which is suitable for performing all types of underwater cutting operations without the need for a source of oxygen and all the attendant valve mechanisms required when using oxygen underwater.

Furthermore, the torch of the present invention can be used for welding by simply inserting a welding electrode of proper size in the recess 18 and applying a current to the electrode without using fluid forced under pressure through passageway 22.

The torch of the present invention can be embodied in many geometrical forms the choice being limited only by that which is convenient to a welder.

The invention is in no way limited to materials of construction, these being selected based upon the need for either insulating or conductive properties in the various parts of the torch.

Having thus described our invention what we desire to be secured by Letters Patent of the United States is set forth in the appended claims.

We claim:

1. An underwater electric-arc cutting and gouging torch for use in the water-carbon arc cutting and gouging process comprising in combination:
    an electrically insulating handle having an outer surface adapted to facilitate gripping by the hand of a user;
    an electrically conductive torch head mounted on said handle said torch head including a recess so constructed and arranged to receive and clamp an elongated solid copper coated graphite cutting and gouging electrode which has its outer surface projecting beyond said clamp covered with a waterproof coating, and a passage in said head terminating in at least one nozzle-like aperture adjacent said recess each of said recess and said passage being elongated and having parallel longitudinal axes;
    an insulating coating on all outwardly exposed surfaces of said head to prevent electrical shock to the user;
    means for bringing electrical current from a source of such current to an electrode held in said recess; and
    means for bringing water under pressure greater than that in the environment where the torch is used to said passage whereby when said torch is used for cutting said water exits from said nozzle-like aperture at high pressure in a direction along one side of the length of and toward the projecting end of the electrode disposed in said recess and to an arc struck between said electrode and said workpiece.

2. A torch according to claim 1 wherein the passage terminates in a plurality of nozzle-like apertures for directing the fluid in a direction generally along said electrode.

3. A torch according to claim 1 wherein said recess is an elongated cylindrical bore having a diameter adapted to receive an electrode of generally elongated cylindrical shape.

4. A torch according to claim 1 wherein said recess is an elongated bore having a cross-sectional shape in the form of a rectangle with generally semi-circular ends to receive generally elongated flat electrodes having a complimentary cross-sectional shape.

* * * * *

UNITED STATES PATENT AND TRADEMARK OFFICE
CERTIFICATE OF CORRECTION

PATENT NO. : 4,131,780
DATED : December 26, 1978
INVENTOR(S) : Harold J. Trabbold and Jerry R. Hummel It is certified that error appears in the above-identified patent and that said Letters Patent are hereby corrected as shown below:

On Introduction Page
   Change Assignee from "Air Products and Chemicals, Inc., Allentown, Pa." to -- Arcair Company, Lancaster, Ohio --

Signed and Sealed this

First Day of May 1979

[SEAL]

Attest:

RUTH C. MASON
Attesting Officer

DONALD W. BANNER
Commissioner of Patents and Trademarks